United States Patent
Wang et al.

(10) Patent No.: US 8,229,909 B2
(45) Date of Patent: Jul. 24, 2012

(54) MULTI-DIMENSIONAL ALGORITHM FOR CONTEXTUAL SEARCH

(75) Inventors: Anping Wang, Redwood City, CA (US); Tim Richardson, Mesa, AZ (US); Do Joon Ra, Mountain View, CA (US); David Chen, N. Potomac, MD (US)

(73) Assignee: Oracle International Corporation, Redwood Shores, CA (US)

( * ) Notice: Subject to any disclaimer, the term of this patent is extended or adjusted under 35 U.S.C. 154(b) by 478 days.

(21) Appl. No.: 12/415,921

(22) Filed: Mar. 31, 2009

(65) Prior Publication Data

US 2010/0250530 A1    Sep. 30, 2010

(51) Int. Cl.
*G06F 7/00* (2006.01)
(52) U.S. Cl. ............... 707/705; 707/706; 707/713
(58) Field of Classification Search ............. 707/640
See application file for complete search history.

(56) References Cited

U.S. PATENT DOCUMENTS

| | | | |
|---|---|---|---|
| 6,327,590 B1 | 12/2001 | Chidlovskii et al. | |
| 7,225,183 B2 * | 5/2007 | Gardner | 1/1 |
| 7,266,545 B2 * | 9/2007 | Bergman et al. | 707/706 |
| 7,289,806 B2 | 10/2007 | Morris et al. | |
| 7,305,380 B1 | 12/2007 | Hoelzle et al. | |
| 7,444,358 B2 * | 10/2008 | Paczkowski et al. | 1/1 |
| 7,461,043 B2 * | 12/2008 | Hess | 706/46 |
| 7,668,867 B2 * | 2/2010 | Morris et al. | 707/705 |
| 7,693,834 B2 * | 4/2010 | Gross et al. | 707/713 |
| 7,707,143 B2 * | 4/2010 | Bruce et al. | 707/999.003 |
| 7,739,408 B2 * | 6/2010 | Fish et al. | 709/246 |
| 7,769,803 B2 * | 8/2010 | Birdwell et al. | 709/201 |
| 7,801,845 B1 * | 9/2010 | King et al. | 707/608 |
| 7,899,803 B2 * | 3/2011 | Cotter et al. | 707/706 |
| 7,908,259 B2 * | 3/2011 | Branscome et al. | 707/705 |
| 7,937,389 B2 * | 5/2011 | Jiao et al. | 707/736 |
| 7,987,176 B2 * | 7/2011 | Latzina et al. | 707/713 |
| 2002/0095585 A1 * | 7/2002 | Scott | 713/185 |
| 2004/0006593 A1 * | 1/2004 | Vogler et al. | 709/203 |
| 2004/0187075 A1 * | 9/2004 | Maxham et al. | 715/511 |
| 2004/0230572 A1 * | 11/2004 | Omoigui | 707/3 |
| 2005/0160107 A1 * | 7/2005 | Liang | 707/100 |
| 2005/0289168 A1 | 12/2005 | Green et al. | |
| 2005/0289264 A1 * | 12/2005 | Illowsky et al. | 710/104 |
| 2006/0041550 A1 * | 2/2006 | Bennett et al. | 707/5 |
| 2006/0047646 A1 * | 3/2006 | Maluf et al. | 707/4 |
| 2006/0059028 A1 * | 3/2006 | Eder | 705/7 |
| 2006/0095470 A1 * | 5/2006 | Cochran et al. | 707/104.1 |
| 2006/0112104 A1 * | 5/2006 | An et al. | 707/10 |
| 2007/0005686 A1 * | 1/2007 | Fish et al. | 709/203 |
| 2007/0198505 A1 * | 8/2007 | Fuller | 707/5 |

(Continued)

OTHER PUBLICATIONS

Zhicheng Dou, Multi-dimensional Search Result Diversification, ACM, 2011, 10 pages, <URL: http://delivery.acm.org/10.1145/1940000/1935897/p475-dou.pdf>.*

(Continued)

*Primary Examiner* — Thuy Dao
*Assistant Examiner* — Hua Lu
(74) *Attorney, Agent, or Firm* — Marger Johnson & McCollom, P.C.

(57) ABSTRACT

A computer-implemented method can include building a multi-dimensional contextual model, receiving search terms from a user, performing a search based on the search terms and the multi-dimensional contextual model, generating search results based on the search, and visually displaying the search results.

16 Claims, 5 Drawing Sheets

U.S. PATENT DOCUMENTS

| | | | | |
|---|---|---|---|---|
| 2007/0214133 | A1* | 9/2007 | Liberty et al. | 707/5 |
| 2007/0226195 | A1 | 9/2007 | Huck | |
| 2007/0239734 | A1 | 10/2007 | Arellanes et al. | |
| 2008/0133504 | A1 | 6/2008 | Messer et al. | |
| 2009/0013038 | A1* | 1/2009 | Vogler et al. | 709/203 |
| 2009/0099932 | A1* | 4/2009 | Ahopelto | 705/14 |
| 2010/0070448 | A1* | 3/2010 | Omoigui | 706/47 |
| 2010/0076952 | A1* | 3/2010 | Wang et al. | 707/706 |
| 2010/0082634 | A1* | 4/2010 | Leban | 707/741 |
| 2010/0100546 | A1* | 4/2010 | Kohler | 707/739 |
| 2010/0169354 | A1* | 7/2010 | Baby et al. | 707/765 |
| 2010/0171993 | A1* | 7/2010 | Longobardi et al. | 358/403 |
| 2010/0250530 | A1* | 9/2010 | Wang et al. | 707/732 |
| 2010/0250858 | A1* | 9/2010 | Cremelie et al. | 711/136 |
| 2010/0287466 | A1* | 11/2010 | Ravid et al. | 715/256 |
| 2011/0016137 | A1* | 1/2011 | Goroshevsky et al. | 707/758 |
| 2011/0055235 | A1* | 3/2011 | Lafoucriere et al. | 707/705 |

OTHER PUBLICATIONS

Christopher Peery, Multi-dimensional Search for Personal Information Management Systems, ACM, 2008, 12 pages, <URL: http://delivery.acm.org/10.1145/1360000/1353400/p464-peery.pdf>.*

Indrajit Bhattacharyya, Vector GA—A Novel Enhancement of Genetic Algorithms for Efficient Multi-variable or Multi-dimensional Search, ACM, 2009, 5 pages, <URL: http://delivery.acm.org/10.1145/1650000/1640163/p1-bhattacharyya.pdf>.*

Ilaria Bartolini, Multi-dimensional Keyword-based Image Annotation and Search, ACM, 2010, 6 pages, <URL: http://delivery.acm.org/10.1145/1870000/1868371/a5-bartolini.pdf>.*

Erich Gstrein, Adaptive Personalization: A Multi-dimensional Approach to Boosting a Large Scale Mobile Music Portal, Google Scholar, 2009, 8 pages, <URL: http://sat.researchstudio.at/downloads/publications/gstrein_musicnetwork_2005.pdf>.*

Celia da Costa Pereira, Multidimensional Relevance: A New Aggregation Criterion, Google Scholar, 2009, 12 pages, <URL: http://www.springerlink.com/content/x312772641823331/fulltext.pdf>.*

Kerschberg, Larry, et al., "A Personalizable Agent for Semantic Taxonomy-Based Web Search" http://eceb.gmu.edu/pubs/WebSifterWRANCH-Incs.pdf, retrieved Oct. 1, 2008.

Pahlevi, S.M., et al., "Taxonomy-based adaptive Web search method", Proceedings of the International Conference on Information Technology: Coding and Computing, Apr. 8-10, 2002, 6 pages.

Eibe, S., et al., "Towards User Context Enhance Search Engine Logs Mining" http://www.springerlink.com/content/m606521153666230/fulltext.pdf?page=1, retrieved Oct. 1, 2008.

Mirza, Said, et al., "Conveying taxonomy context for topic-focused Web search: Research Articles" http://portal.acm.org/citation.cfm?id=1059557.1059564&coll=&dl, retrieved Oct. 1, 2008.

Fontoura, Marcus, et al., "Relaxation in Text Search using Taxonomies" http://www.cs.cmu.edu/~olston/publications/vldb08b.pdf, retrieved Oct. 1, 2008.

Shen, et al.; "Exploiting Query History for Document Ranking in Interactive Information Retrieval," Proceedings of the 26th Annual international ACM SIGIR Conference on Research and Development in Information Retrieval, Jul. 28-Aug. 1, 2003, pp. 377-378, SIGIR '03, ACM, New York, NY.

Sriram, et al.; "A session-based search engine," In Proceedings of the 27th Annual international ACM SIGIR Conference on Research and Development in information Retrieval, Jul. 25-29, 2004, pp. 492-493, SIGIR '04, ACM, New York, NY.

Shen, et al.; "Context-sensitive information retrieval using implicit feedback," In Proceedings of the 28th Annual international ACM SIGIR Conference on Research and Development in information Retrieval, Aug. 15-19, 2005, pp. 43-50, SIGIR '05, ACM, New York, NY.

* cited by examiner

MULTI-DIMENSIONAL ALGORITHM FOR CONTEXTUAL SEARCH

BACKGROUND

Recently, searching applications such as Internet search engines tend to be moving toward the use of full text search instead of relational search. This can be attributed to the simplicity and speed that is typically afforded by the use of full text searching. These searching applications tend to be context-agnostic. That is, search results tend to be obtained by using a searching function with keywords as the input thereto. The search results, which are also referred to as search hits, are typically defined as search results in which at least some of the keywords appear. These search hits are often ordered by a pre-computed score that takes into account certain attributes such as page ranking, creation or update time, frequency of access, and metadata associated with the results.

Some current research has been performed in an attempt to improve the user search experience by taking into account certain contextual information. However, the algorithms that have been used in these attempts are confined to either language-based algorithms or general topic-based algorithms.

Thus, there remains a need for a way to address these and other deficiencies that are associated with the prior art.

DETAILED DESCRIPTION

Figure 1:
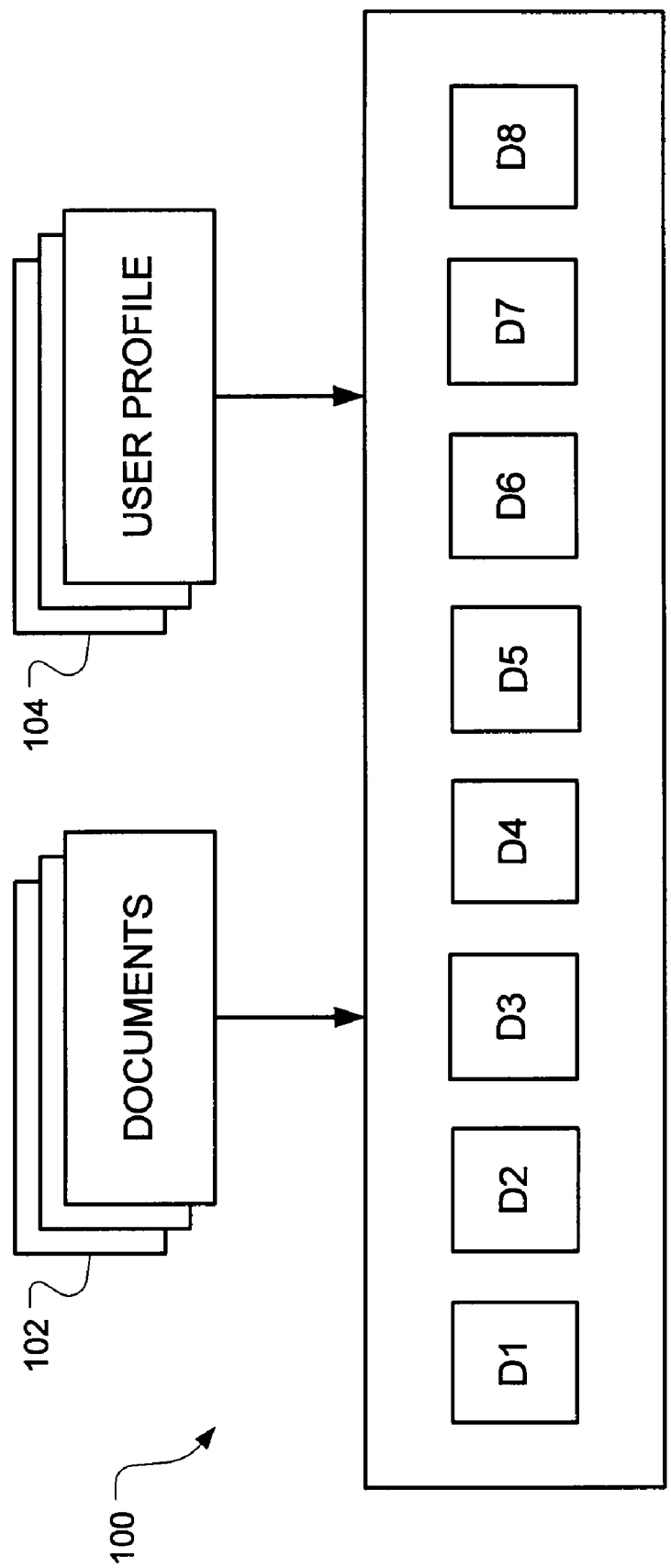
FIG. 1 illustrates a first example of a multi-dimensional contextual model in accordance with implementations of the disclosed technology.

Embodiments of the disclosed technology can enhance searching applications such as Internet search engines by incorporating context as well as keywords into a search function. By taking context into account when executing a search function, the search becomes a personalized search. In certain embodiments, the search engine can be based on a pre-defined contextual model. Different contexts can result in the search engine ranking results differently.

Certain implementations of the disclosed technology can include the application of a Google-style search to application data where the search is capable of taking into account particular contextual information that may be available from the context of the application. In order to take into account domain-specific contextual information, a multi-dimensional model can be used to model the contextual information. Search results can thus be ranked based on multiple profiles at the same time, where each type of profile can be viewed as a separate dimension.

Implementations of the disclosed technology can advantageously provide a framework that allows search application developers to create domain-specific search solutions by devising a domain-specific multi-dimensional model. By allowing search application develops to incorporate the use of a number of different dimensions, the search application developers are able to create efficient and effective domain-specific search solutions. These search solutions can be used in connection with human resource and customer relationship management (CRM) applications to sort business objects, for example.

Certain embodiments of the disclosed technology can include a measurement framework that involves the measurement of context within a multi-dimensional space. In such embodiments, both user context and documents to be searched can be measured in the same dimensional space and a similarity can be calculated based on the measured distance between them. The measured distance can then be used to calculate a degree of relevance therebetween.

Certain implementations can begin with the establishment of a multi-dimensional model. Once the multi-dimensional model has been constructed, a subsequent application of an algorithm can enable the searcher to make use of the multi-dimensional model to contextualize the full text search. Thus, such applications can provide a multi-dimensional model that is capable of allowing developers to create virtually any domain-specific multi-dimensional contextual model and apply the multi-dimensional contextual model to the search in order to influence scoring and potential ordering of the search results.

While current searching applications tend to focus on a general defined or fixed taxonomy and use page rank attributes as scoring factors, embodiments of the disclosed technology can provide a modeling taxonomy that is capable of suiting a specific domain. For example, certain embodiments can include the application of a language model as well as the use of a divergence model to influence the results rather than merely relying on page rank.

The language model can be applied to virtually any body of text. Implementations of the disclosed technology can include application of the language model to documents, a user profile, and dimensions. The language model can generate certain facts about a given document, such as how often a word appears in the document (e.g., in relation to other words) and where the word appears within the document, for example. The generated facts can then be used to score the similarity of two different documents.

Certain embodiments can also include a learning capability aspect. For example, each document added to a multi-dimensional contextual model can provide additional information about the user's identity information and/or interests that can be used in connection with subsequent searches by the user.

While some existing searching applications focus on topN queries and/or the use of a query expansion based language model with a fixed taxonomy, embodiments of the disclosed technology can provide a general framework to enable the creation of a custom taxonomy that can be used to model contextual information and that can also be applied to an entire corpus of documents.

Thus, implementations of the disclosed technology can be used to enrich an application search experience and improve a user's productivity by personalizing the user's searching. For example, the searching techniques described herein can take into account information pertaining to a user's identity (e.g., personal information and/or work-related information such as job functions or roles) and interests (e.g., explicit or implied).

Embodiments of the disclosed technology, such as the construction and use of multi-dimensional contextual models in a desired search, can be used in connection with virtually any provided search solution.

Contextual Models

When users perform a search, keywords are often taken out of context. For example, consider a person performing a search using the keyword "Amazon." The context around this keyword would be driven by a determination as to who is performing the search (e.g., what are the user's interests). This information can be modeled as a document (e.g., a user profile).

When a typical search engine performs a match, however, it often leaves out the context. For example, the following documents would be treated equally by a typical search engine in response to a search request using the keyword "Amazon":

Document 1: "Amazon" is a river in South America

Document 2: "Amazon" is the largest online shopping site

A context as used herein refers to the meta information of a body of text (e.g., document, dimensions, and user profile) used to categorize the text against a particular measuring system. A document generally refers to text to be searched in response to a search request. A user profile generally refers to a representation of the user (e.g., information related to the user). A dimension generally refers to a representation of an aspect of context and can be materialized as a meta word or words. A dimension can consist of a body of text (e.g., similar to a document) as well as some structures such as relationship and weights, for example.

A contextual model as used herein refers to a measurement system within which a context can be measured. A multi-dimensional contextual model can use multiple dimensions to measure document context and user profile context.

Whereas a contextual model has been previously limited to a one-dimensional space based on a common sense approach, implementations of the disclosed technology can define a multi-dimensional contextual model in which the dimensions can be hierarchical arranged in a particular fashion, as described below.

A contextual model as used herein generally refers to a model that can be used to measure and compare various items or attributes of interest. Also, a contextual model is generally user-specific or group-specific.

A multi-dimensional contextual model refers to a contextual model that has multiple dimensions. As used herein, a dimension generally refers to an aspect, characteristic, category, or other commonality corresponding to a group of various items of interest for search users. A dimension can thus be defined by topics that are each characterized by category words, which will also be referred to herein as mega words.

A category word or mega word can have its own structure. For example, consider an example of a dimension having a mega word "animal." The mega word "animal" can have the following words associated with it: "cat," "dog," and "tiger." In certain embodiments, the sub-words can be ordered, rated, and/or ranked. In the example, "cat," "dog," and "tiger" are arranged alphabetically. In alternative embodiments, the words can be ranked differently based on criteria other than alphabetical placement. For example, the words can be ranked based on the average size and/or weight of each animal.

A dimension in accordance with the disclosed technology is typically either common sense based or taxonomy based. In addition, dimensions are generally non-orthogonal and fuzzy, such as an example dimension having the mega words "animal" and "science." A dimension can also be domain specific. In other words, a dimension can be designed for a specific domain.

In certain embodiments, each dimension of a multi-dimensional contextual model can be rated. That is, words used to define the dimension can each carry a different weight that reflects the relevance of the word to the topic. In alternative embodiments, a dimension can have multiple keywords that are organized in a hierarchical fashion.

Consider an example in which there are two dimensions: "male" and "female." Whereas the "male" dimension can have associated therewith certain items of interest specific to the dimension, such as cars or electronic devices, the "female" dimension can have associated therewith different items of interest specific to "female," such as clothing. Associated items of interest can be automatically determined (e.g., via stereotypes) or received via user input or suggestion.

In certain embodiments, a given dimension can pertain to one of the following information types: politics, science, technology, economics, and sports. One having ordinary skill in the art will appreciate that the listed information types are merely exemplary and that the listing is not intended to be comprehensive. There are various other kinds of information types that can each be used in addition to and/or in place of any of the other information types.

Consider an example in which a user is a fan of a particular sports team. A contextual model that contains information pertaining to sports can be constructed for the user. The information in the contextual model can indicate the particular sports team that the user supports.

FIG. 1 illustrates a first example of a multi-dimensional contextual model 100 in accordance with implementations of the disclosed technology. The multi-dimensional contextual model 100 includes a document context 102, a user profile context 104, and eight dimensions D1-D8. The document context 102 can store a corpus of documents to be searched. Each of the dimensions D1-D8 can correspond to a particular information type such as any of the exemplary information types listed above.

In the example, the document context 102 can include a wide variety of documents to be searched in response to a search request by a user. The content of the documents can be related, rated, and/or structured. Also, metadata can be stored for each document, where the metadata can pertain to document keywords, attributes, or other information that is specific to the document such as the author, the title, or specific content within the body of the document.

The user profile context 104 can include various types of information pertaining to the search user. The information can be explicit (e.g., provided as input directly by the user) or implicit (e.g., by monitoring the user's searching habits). The user profile context 104 can include information pertaining to the user's identity, such as work-related roles that are currently assigned to the user. The user profile 104 can store time or location related information, demographic information, and/or enterprise context information specific to the user.

The user profile context 104 can also include the user's query history and/or click history (e.g., over a certain period of time), bookmarks, tags, favorite items, and other potentially Internet-related items of interest. Each source can have its own weight such that recent query-related information can be deemed more pertinent to a given search than older query-related information, for example.

When a user submits a search having certain search criteria, the system can identify at least one n-dimensional point within the documents 102 and an n-dimensional point for the user profile 104 based on the dimensions D1-D8. Once identified, the system can measure distances between the identified document points and user profile to produce a list of search hits to be provided to the user. This process is discussed in greater detail below, particularly with respect to FIGS. 5 and 6.

Figure 2:
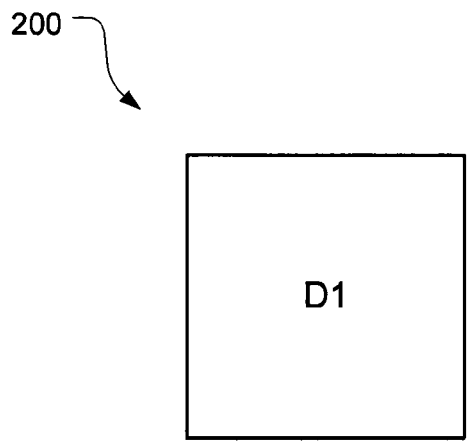
FIG. 2 illustrates a first example of the first dimension of the multi-dimensional contextual model illustrated FIG. 1 in accordance with implementations of the disclosed technology.

FIG. 2 illustrates a first example 200 of the first dimension D1 of FIG. 1 in which the dimension corresponds to an information type "transportation" and has the following words associated therewith: automobile, car, truck, bike, plane, jaguar, and travel. Each word can be rated based on its relevance and ranked based on its rating. In the example, the word "automobile" has a rating of 6, signifying that the word "automobile" has a notable relevance to the dimension. The words "car," "truck," "bike," and "plane" each have a rating of 3, "jaguar" has a rating of 1, and "travel" has a rating of 0.5. In the example, the words are ranked based on rating such that the higher the rating, the higher the word is positioned in the list.

Figure 3:
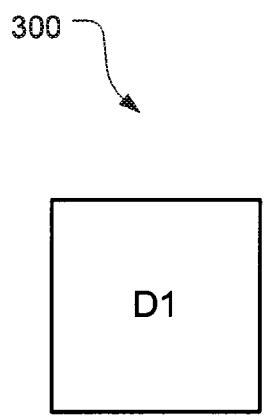
FIG. 3 illustrates a second example of the first dimension of the multi-dimensional contextual model illustrated FIG. 1 in accordance with implementations of the disclosed technology.

FIG. 3 illustrates a second example 300 of the first dimension D1 of FIG. 1 in which the dimension again corresponds to an information type "transportation" but is defined by the following set of keywords: automobile, car, truck, bike, and plane. In the example, the keywords can be organized in a hierarchical fashion. For example, "car" and "truck" are hierarchically contained within "automobile," which is separate from "bike" and "plane."

Figure 4:
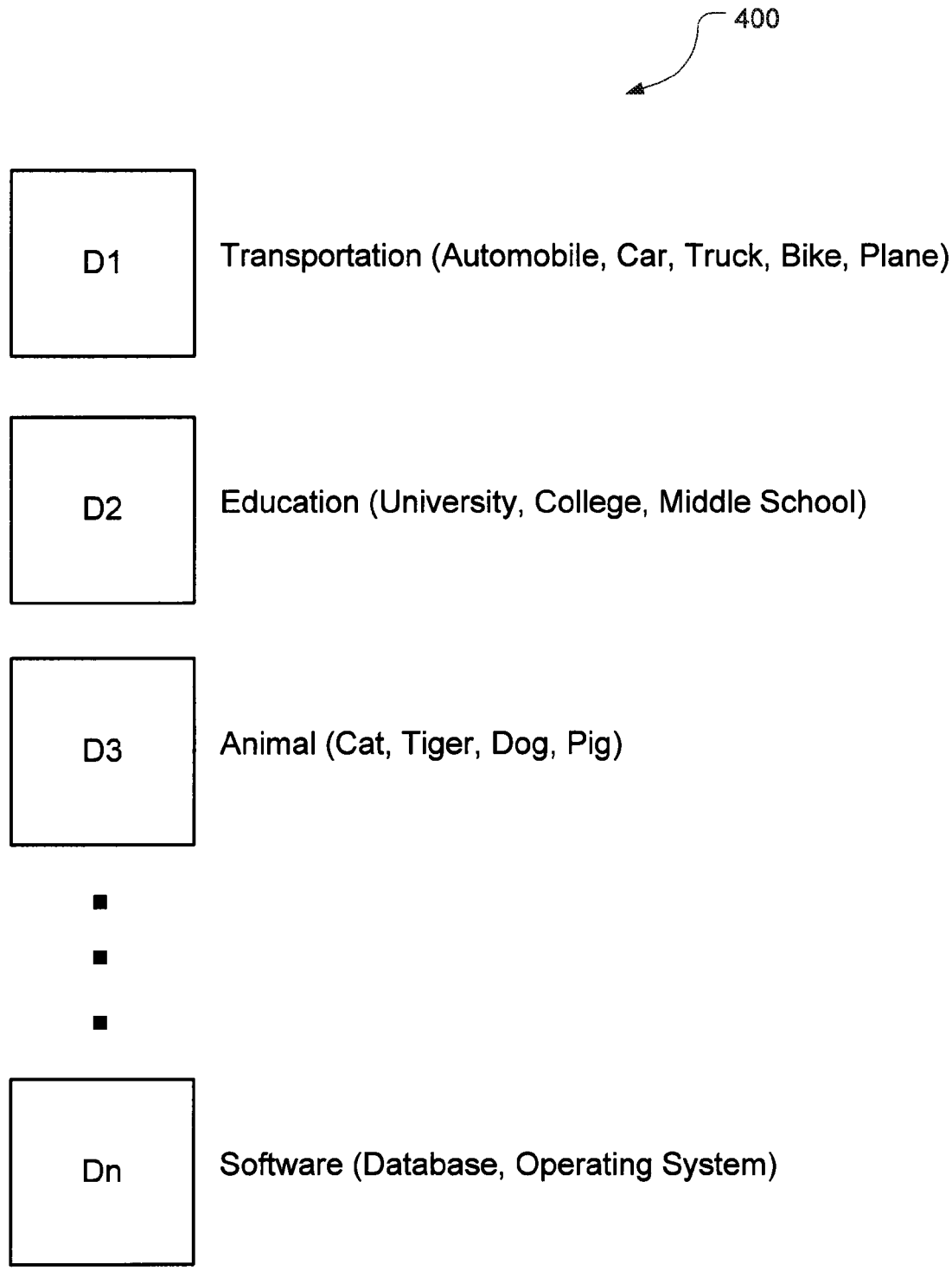
FIG. 4 illustrates a second example of a multi-dimensional contextual model in accordance with implementations of the disclosed technology.

FIG. 4 illustrates a second example of a multi-dimensional contextual model 400 in accordance with implementations of the disclosed technology. In the example, the multi-dimensional contextual model 400 has n dimensions D1-Dn, where each dimension D1-Dn corresponds to a particular information type. For example, the first dimension D1 pertains to information type "transportation," the second dimension D2 pertains to information type "education," and the third dimension D3 pertains to information type "animal." The nth dimension Dn pertains to information type "software."

In the example, the first dimension D1 is defined by the words "automobile," "car," "truck," "bike," and "plane," the second dimension D2 is defined by the words "university," "college," and "middle school," the third dimension is defined by the words "cat," "tiger," "dog," and "pig," and the nth dimension Dn is defined by the words "database" and "operating system."

Divergence and Document Scoring

Implementations of the disclosed technology can thus allow developers to create a multi-dimensional model based on a given domain of data to be searched. Categories can be defined for each dimension. Each dimension can be seeded in a particular search engine (e.g., as an attribute). Depending on what words are within each document, the document can be scored into each dimension, thereby yielding a multi-dimensional score for the document. With a defined model, an algorithm that uses a language probability model can be used to profile both documents to be searched as well as a user profile.

In order to produce a multi-dimensional score for a given document, a language model can be applied to both the document and a dimension (e.g., represented by a body of text that might pertain to some structure). A divergence model can then be applied in order to measure the similarity (i.e., represented by a score) between the document and the dimension. This process can be repeated for all applicable dimensions in order to produce an n-d point. This process can also be applied to a user profile in order to produce the n-d point for a given user.

Since all of the documents can carry an n-d score, the distance of each document to the user profile n-d score can be used to sort the relevance of the documents to the user profile. Such an algorithm can be used for sorting topN results and can also influence the scoring over the entire corpus of documents. Whereas current applications tend to focus on one-dimensional word searches, embodiments of the disclosed technology can include a higher-level (e.g., category-level) scoring of each document within the corpus of documents.

Figure 5:
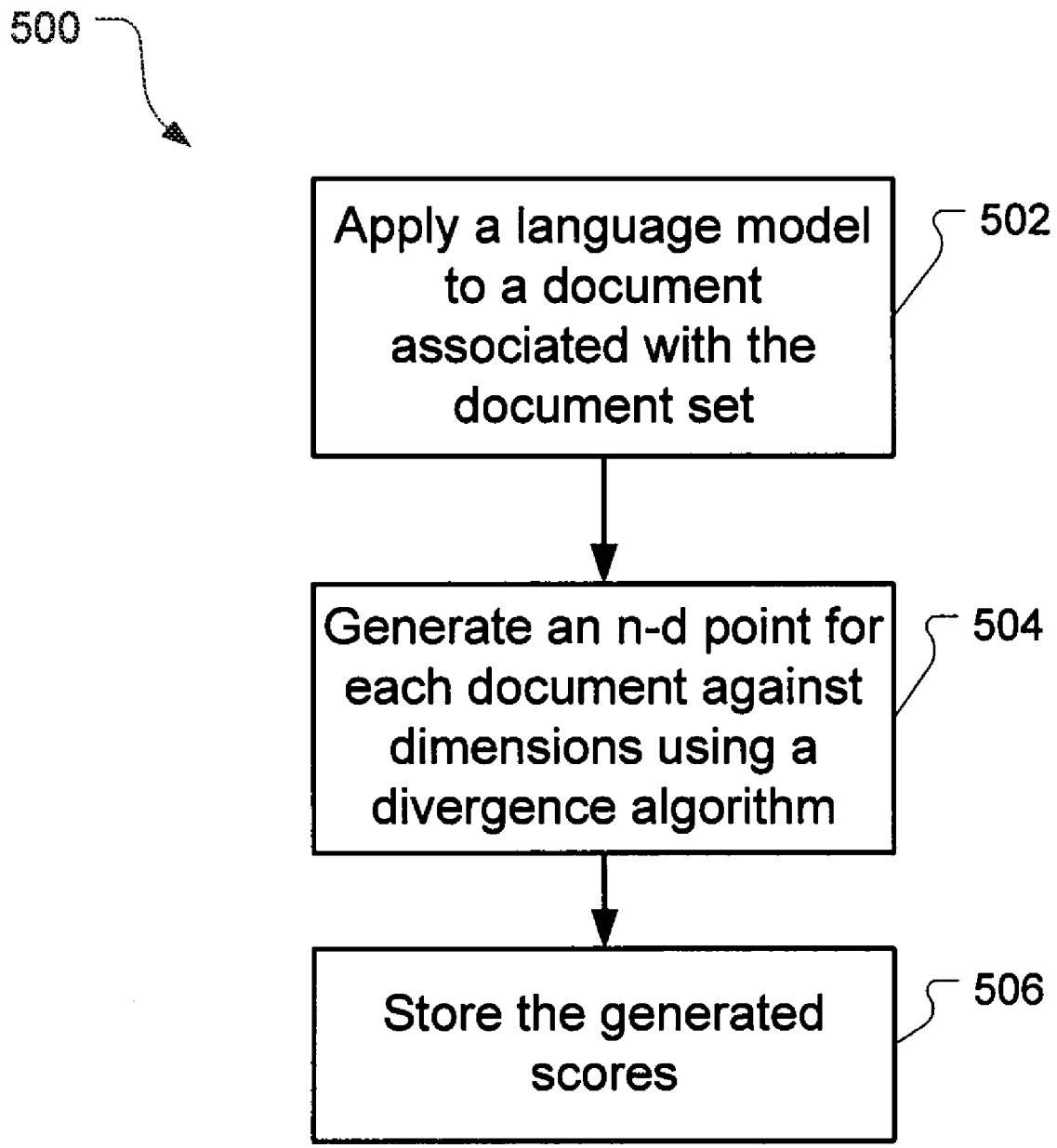
FIG. 5 illustrates an example of a computer-implemented method of generating and storing document distributions for a document context in accordance with implementations of the disclosed technology.

FIG. 5 illustrates an example of a computer-implemented method 500 of generating and storing document context distributions in accordance with implementations of the disclosed technology.

At 502, a language or linguistic model can be applied to a document associated with the document set. In certain implementations, some or all of the application of the language model to the document set can be performed at crawl time.

At 504, an n-d point can be generated for each document against dimensions using a divergence algorithm based on application of the language model to the document context at 502. If there are eight dimensions, for example, then eight numbers can be generated for the document, one for each dimension. Thus, each document can be profiled by the multi-dimensional contextual model.

At 506, the generated scores can be stored (e.g., in a database). The stored scores can be subsequently used as part of a user search, as discussed below in relation to FIG. 6.

Figure 6:
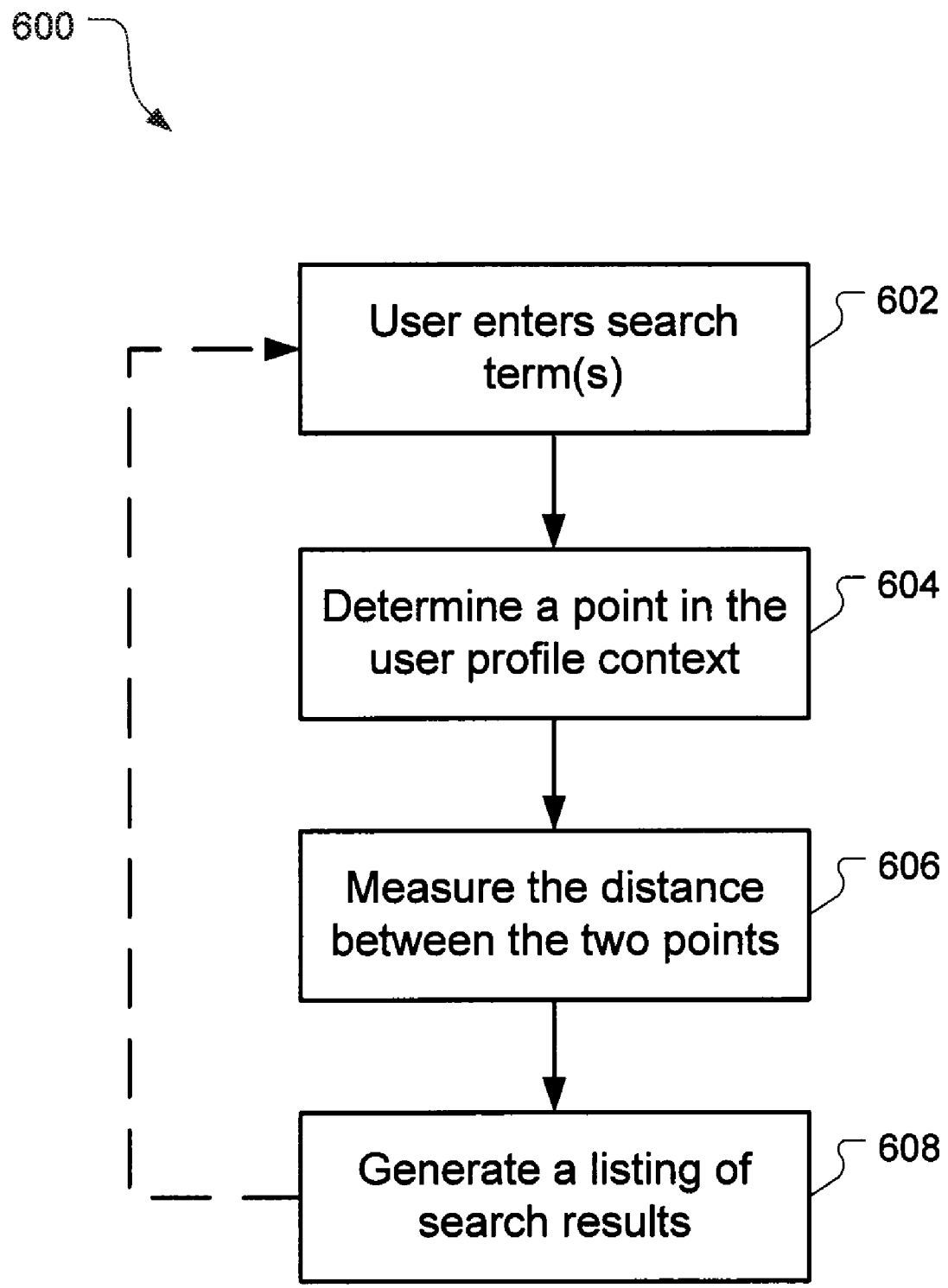
FIG. 6 illustrates another example of a method of using a multi-dimensional contextual model to perform a search in accordance with implementations of the disclosed technology.

FIG. 6 illustrates an example of a computer-implemented method 600 of using a multi-dimensional contextual model to perform a search in accordance with implementations of the disclosed technology. Embodiments of the computer-implemented method 600 can generally be used in connection with topN and virtually any existing search engine.

At 602, a user can enter one or more search terms. The user can enter virtually any number or combination of search terms. In an example, the user enters the following terms: "Oracle" and "enterprise applications." In certain embodiments, a distribution of probabilities can be determined for each search term, as discussed below.

At 604, a multi-dimensional point in the multi-dimensional space of the user profile context can be determined. For example, a language or linguistic model can be applied to a user profile context, such as the user profile context 104 of FIG. 1. In certain embodiments, historical data can be used in connection with the user profile context. The user profile context point can be identified using coordinates. For example, if there are five dimensions associated with the user profile context, an example of a user profile context point can have the following coordinates: (1.2, 2.3, 0.3, 2.1, 2.1).

The application of a language model to a user via a user profile context, can personalize a user's search by essentially inserting the user's information (e.g., identity and/or interests) into the query. Consider an example in which a user desires to execute a search for "apple" or "blackberry." If the user is a person whose business is agricultural in nature, implementations of the disclosed technology would assume that the search terms refer to the fruits apples and blackberries. If the user is a person whose business is related to the electronics industry, however, the application would assume that the search terms refer to the company "Apple" and the handheld electronic device "Blackberry."

At 606, a distance between the user profile context point and the document context point, which is pre-calculated and stored with the document, can be measured (e.g., by running a matching algorithm against a document distribution). As used herein, the measured distance generally defines a level of similarity between the user profile context entity and the document context entity within the multi-dimensional contextual model space.

At 608, a listing of search results or hits (e.g., individually identified documents) can be generated based on the measuring. In certain embodiments, the measured distance can be used to rank the documents against the user profile. For example, a document associated with a document context point that has the shortest measured distance to a corresponding user profile context point can be ranked first, thereby designating the document as potentially being the most pertinent document to the user's search based on the search terms provided by the user at 602.

After 608, the search results can be stored and/or transmitted (not shown). A user (e.g., the user that entered the initial search terms) can perform a new search based on the search results or modify the current search, as indicated by the dashed line in FIG. 6. Alternatively, the user can stop the searching process at this point. Also, any or all of the user profile context, document context, and specific documents can be updated based on the search results. For example, a user's search history can be stored and the search terms used as well as the search results can be used to update the user's user profile context.

Search Engine Scoring

Implementations of the disclosed technology can include search engine scoring as a factor in addition to a user's profile. For example, the similarity between two documents can be measured by a score determined by application of a divergence algorithm. The similarity of a document and a dimension can form one value (e.g., D1) for the document in a multi-dimensional model. Thus, for a document n, an n-d value can be generated based on similarities of the document against all applicable dimensions (e.g., D1, D2, D3, ... Dn). A similar process can be used for a user profile by treating the user profile as a document against all applicable dimensions (e.g., S1, S2, S3, ... Sn).

The similarity of a given document for a particular user profile can be measured as the following distance:

$$\text{sum}(|Di-Si|)$$

where i ranges from 1 to n. A score can then be determined for a given document. For example, implementations of the disclosed technology can include application of the following algorithm in order to determine a score for a given document in light of a certain user profile:

$$\text{Total score} = r^*\text{sec} + (1-r)^*\text{sum}(Wi^*|Si-Di|)$$

where sec is the search engine score, r is a factor to weight the search engine score and personalization profile, Wi is a factor to weight the ith dimension, and Di is a score of the document on the same dimension, and Si is the score of the user profile on the same dimension. The weighting factors can be used to ensure that the search results are not too biased toward a particular aspect. For example, the generated score can be used to decide which particular document should be returned first.

Certain implementations of the disclosed technology can also include a learning capability that can be used to enrich the dimension definition. For example, the system can monitor a user's interaction with the searching techniques described herein and track the search terms used as well as the search hits that result from using the search terms.

General Description of a Suitable Machine in which Embodiments of the Disclosed Technology can be Implemented The following discussion is intended to provide a brief, general description of a suitable machine in which embodiments of the disclosed technology can be implemented. As used herein, the term "machine" is intended to broadly encompass a single machine or a system of communicatively coupled machines or devices operating together. Exemplary machines can include computing devices such as personal computers, workstations, servers, portable computers, handheld devices, tablet devices, and the like.

Typically, a machine includes a system bus to which processors, memory (e.g., random access memory (RAM), read-only memory (ROM), and other state-preserving medium), storage devices, a video interface, and input/output interface ports can be attached. The machine can also include embedded controllers such as programmable or non-programmable logic devices or arrays, Application Specific Integrated Circuits, embedded computers, smart cards, and the like. The machine can be controlled, at least in part, by input from conventional input devices (e.g., keyboards and mice), as well as by directives received from another machine, interaction with a virtual reality (VR) environment, biometric feedback, or other input signal.

The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One having ordinary skill in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

Embodiments of the disclosed technology can be described by reference to or in conjunction with associated data including functions, procedures, data structures, application programs, instructions, etc. that, when accessed by a machine, can result in the machine performing tasks or defining abstract data types or low-level hardware contexts. Associated data can be stored in, for example, volatile and/or non-volatile memory (e.g., RAM and ROM) or in other storage devices and their associated storage media, which can include hard-drives, floppy-disks, optical storage, tapes, flash memory, memory sticks, digital video disks, biological storage, and other tangible, physical storage media.

Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

We claim:

1. A computer-implemented method, comprising:
   building a multi-dimensional contextual model comprising a user profile context, the user profile context storing information pertaining to the user, wherein the multi-dimensional contextual model further comprises a document context, the document context storing a plurality of documents to be searched;
   receiving at least one search term from a user;
   performing a search based at least in part on the at least one search term and the multi-dimensional contextual model;
   generating search results based on the search, wherein generating the search results comprises generating a score for each of at least some of the plurality of documents to be searched; and visually displaying the search results.

2. The computer-implemented method of claim 1, wherein generating the search results comprises ranking the search results prior to the visually displaying.

3. The computer-implemented method of claim 1, further comprising storing the search results.

4. The computer-implemented method of claim 1, wherein performing the search comprises determining a multi-dimensional point of a user profile within the user profile context.

5. The computer-implemented method of claim 4, wherein performing the search further comprises determining a multi-dimensional point of the plurality of documents stored within the document context.

6. The computer-implemented method of claim 5, wherein performing the search further comprises measuring a distance between the multi-dimensional point of the plurality of documents and the multi-dimensional point of the user profile.

7. One or more non-transitory, tangible computer-readable media storing instructions that, when executed by a processor, cause a computer to perform the computer-implemented method of claim 1.

8. A computer-implemented method, comprising:
   receiving a search request from a user;
   determining a multi-dimensional point of a user profile within a user profile context, the user profile context storing information pertaining to the user;
   determining a multi-dimensional point for a document within a document context, the document context storing a plurality of documents to be searched;
   generating scores for the plurality of documents to be searched;
   measuring a distance between the multi-dimensional point of the user profile and the multi-dimensional point for the document; and
   determining a plurality of search hits based on the measuring and the generated scores.

9. The computer-implemented method of claim 8, further comprising ordering the plurality of search hits based on the measuring.

10. The computer-implemented method of claim 8, further comprising visually displaying the plurality of search hits.

11. The computer-implemented method of claim 8, further comprising storing the plurality of search hits.

12. The computer-implemented method of claim 8, wherein determining the multi-dimensional point for the document comprises retrieving a stored multi-dimensional point for the document.

13. A hardware searching system, comprising:
   a multi-dimensional contextual model stored on a tangible, computer-readable medium, the multi-dimensional contextual model comprising:
   a user profile context operable to store information pertaining to a user; and
   a document context operable to store a plurality of documents to be searched; and
   a searching tool stored on the tangible, computer-readable medium and, when executed by a processor, operable to perform a search on the plurality of documents to be searched based on the user profile context, the document context, a score generated for each of the plurality of documents, and at least one search term provided by the user.

14. The hardware searching system of claim 13, further comprising an update module stored on the tangible, computer-readable medium and, when executed by a processor, operable to update at least one of the document context and the user profile context.

15. The hardware searching system of claim 13, further comprising a visual display module stored on the tangible, computer-readable medium and, when executed by a processor, operable to visually display search results provided by the searching tool.

16. The hardware searching system of claim 13, further comprising a storing module stored on the tangible, computer-readable medium and, when executed by a processor, operable to store search results provided by the searching tool.

* * * * *